Patented Aug. 7, 1934

1,969,612

UNITED STATES PATENT OFFICE 1,969,612

CAPILLARY-ACTIVE AGENTS

Wilhelm Jakob Kaiser, Benrath-on-the-Rhine, and Alfred Kirstahler, Dusseldorf, Germany, assignors to the firm Henkel & Cie Gesellschaft mit beschränkter Haftung, Dusseldorf, Germany No Drawing. Application August 8, 1933, Serial No. 684,292. In Germany December 7, 1932

5 Claims. (Cl. 252—1)

It has been found that organic compounds which contain at least one lipophile residue and at least one thiosulphuric ester group in the molecule are excellent for use as capillary-active agents, more particularly as wetting, washing, cleansing, emulsifying and dispersion agents.

The compounds possess the general formula $$R.S.SO_3H$$

In this general formula R denotes an organic molecule residue containing at least one lipophile group.

By the term "lipophile group" are to be understood more particularly the higher aliphatic alkyl or acyl groups or their equivalent groups. Such groups are, for example, the normal alkyl residues with 6 and more carbon atoms, as well as the residues of the higher aliphatic carboxylic acids and the naphthenic and resinic acids.

By thiosulphuric acid ester groups are to be understood more particularly those esters of thiosulphuric acid which are bound to the organic residue by the sulphur atoms.

The thiosulphuric acid group may be bound to the lipophile residue either directly or through the medium of bridge groups, which may be formed by carbon atoms or heterogeneous atoms. Such bridge groups, are, for example, ether or ester groups, amino or amido groups, sulphide or sulphonic groups, furthermore carbon bridges such as carbon chains, isocyclic or heterocyclic ring systems or the like.

Preferably, the soluble salts of the said compounds, for example the alkali salts or the salts of ammonium compounds, may be employed for the purposes specified. From among the large number of suitable substances, the following are mentioned by way of example: the sodium salts of higher fatty acid esters of oxyethylthiosulphuric acid ester of the general formula $R.CO.O.CH_2CH_2.S.SO_3Na$, also the sodium salts of higher alkyl esters of (carboxymethyl)—thiosulphuric acid ester of the general formula $R.O.CO.CH_2.S.SO_3Na$, and the like. Such compounds can for instance be obtained according to the process of application Serial No. 701,082 (division of Serial No. 648,725).

The said compounds may be employed as such or in admixture with other substances, for example for the production of foam, as soap substitutes, and for emulsifying, dispersion, impregnation, peptization, stabilizing, equalizing, distributing, dissolving and the like, namely for all purposes where the capillary-active properties of liquids, more particularly of aqueous liquids, is to be increased. Such possible uses exist in very different branches of industry, for example in the textile, leather, fur, paper, and dyestuff industries, the cosmetic industry, the oil and fat industry and so on.

The compounds of the type specified are more particularly distinguished for their resistance to alkaline earth salts and by their ready solubility in water and their resistance to saponifying agents.

We claim:

1. The method of increasing the capillary-active properties of liquids, which comprises adding an organic compound containing at least one lipophile residue and at least one thiosulphuric acid ester group in the molecule.

2. The method of increasing the capillary-active properties of aqueous liquids, which comprises adding a water-soluble salt of an organic compound containing at least one higher alkyl group and at least one $S.SO_3H$ group in the molecule.

3. The method of increasing the capillary-active properties of aqueous liquids which comprises adding a water-soluble salt of an organic compound containing a higher acyl group and the group $S.SO_3H$ in the molecule.

4. A capillary-active agent, of a class which includes wetting, washing, cleansing, emulsifying and dispersion agents and soap substitutes, said capillary-active agent containing organic compounds having at least one lipophile residue and at least one thiosulphuric acid ester group in the molecule.

5. A capillary-active agent, containing water soluble salts of organic compounds having at least one lipophile residue and at least one thiosulphuric acid-ester group in the molecule.

WILHELM JAKOB KAISER.
ALFRED KIRSTAHLER.